United States Patent [19]

Calvin

[11] Patent Number: 5,188,396
[45] Date of Patent: Feb. 23, 1993

[54] REBUILDABLE SLURRY CONDUIT ELBOW

[76] Inventor: Vaughn Calvin, P.O. Box 3908, Bryan, Tex. 77805

[21] Appl. No.: 841,847

[22] Filed: Feb. 26, 1992

[51] Int. Cl.$^5$ ............................................. F16L 55/18
[52] U.S. Cl. ..................................... 285/16; 285/55; 285/93; 285/177; 285/179; 285/367
[58] Field of Search ..................... 285/16, 17, 55, 179, 285/124, 157, 93, 177, 367

[56] References Cited

U.S. PATENT DOCUMENTS

| | | | |
|---|---|---|---|
| 1,314,699 | 9/1919 | Poppenhusen | 285/17 X |
| 1,510,928 | 10/1924 | Ellman | 285/17 X |
| 1,601,093 | 9/1926 | Widmeyer | . |
| 3,284,106 | 11/1966 | McIntosh et al. | 285/55 |
| 3,551,006 | 12/1970 | James | 285/16 |
| 3,768,840 | 10/1973 | Upton et al. | . |
| 3,938,832 | 2/1976 | Preston | 285/157 |
| 4,461,498 | 7/1984 | Kunsman | 285/16 |
| 4,804,207 | 2/1989 | Berchem et al. | 285/16 |
| 4,995,427 | 2/1991 | Berchem | 285/55 X |
| 5,044,670 | 9/1991 | Esser | 285/16 |

FOREIGN PATENT DOCUMENTS

| | | | |
|---|---|---|---|
| 867383 | 2/1953 | Fed. Rep. of Germany | 285/16 |
| 885543 | 12/1961 | United Kingdom | 285/16 |

*Primary Examiner*—Dave W. Arola
*Attorney, Agent, or Firm*—Richard C. Litman

[57] ABSTRACT

A conduit elbow assembly has a radially split outer housing and a replaceable liner. The liner fits loosely within the housing so that material flowing in the elbow accumulates in the void formed in the housing. The hardened liner is thus reinforced, rendering both inner and outer liner hardened surfaces usable in resisting abrasive attack prior to liner failure. A removable housing member exposes the liner for cutting during replacement. Holes in the outer housing permit leakage of fluent material upon liner failure, thus indicating the need for repair prior to conduit rupture. The assembly is adaptable to accommodate varying pipe dimensions within a particular nominal pipe size.

8 Claims, 4 Drawing Sheets

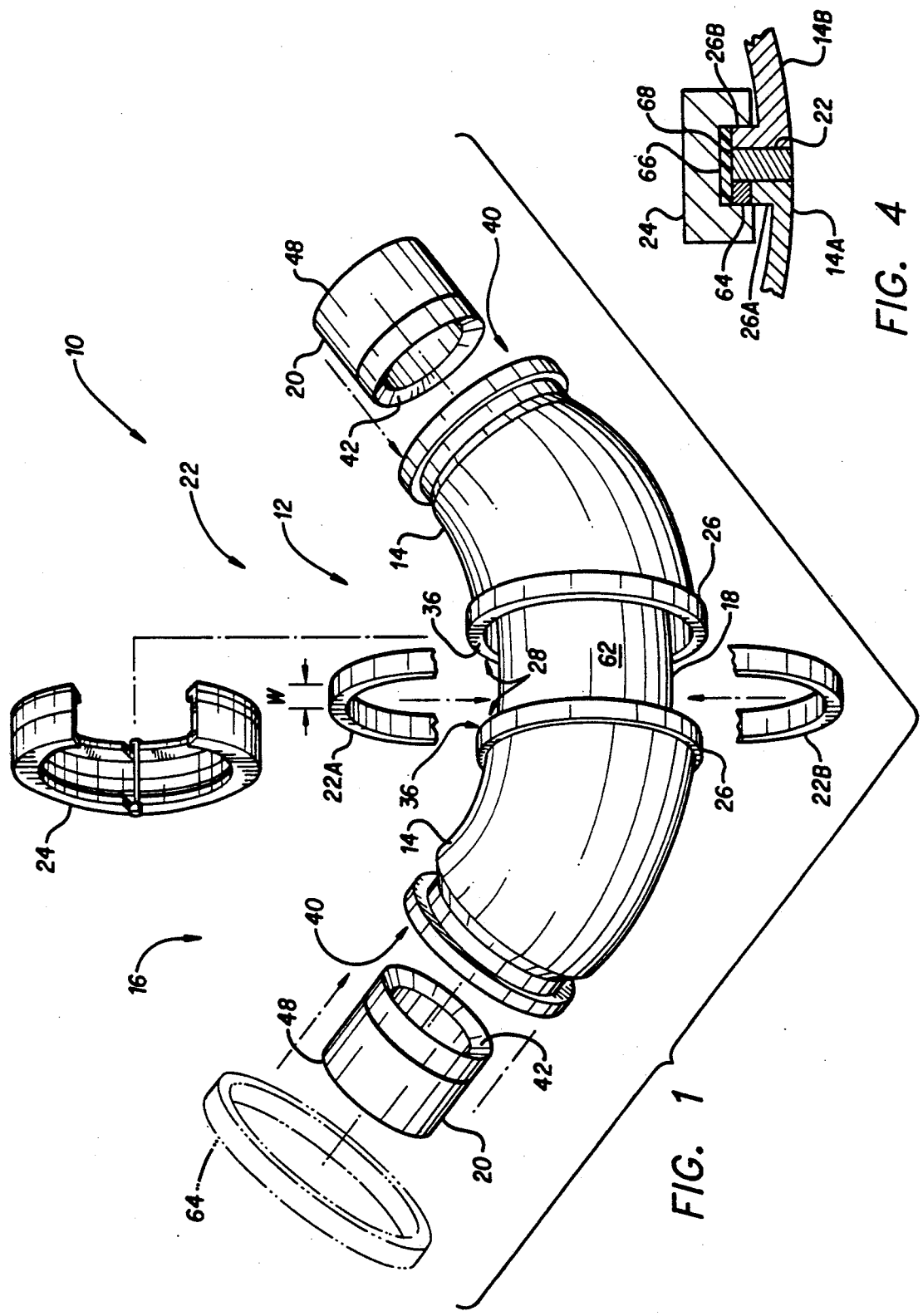

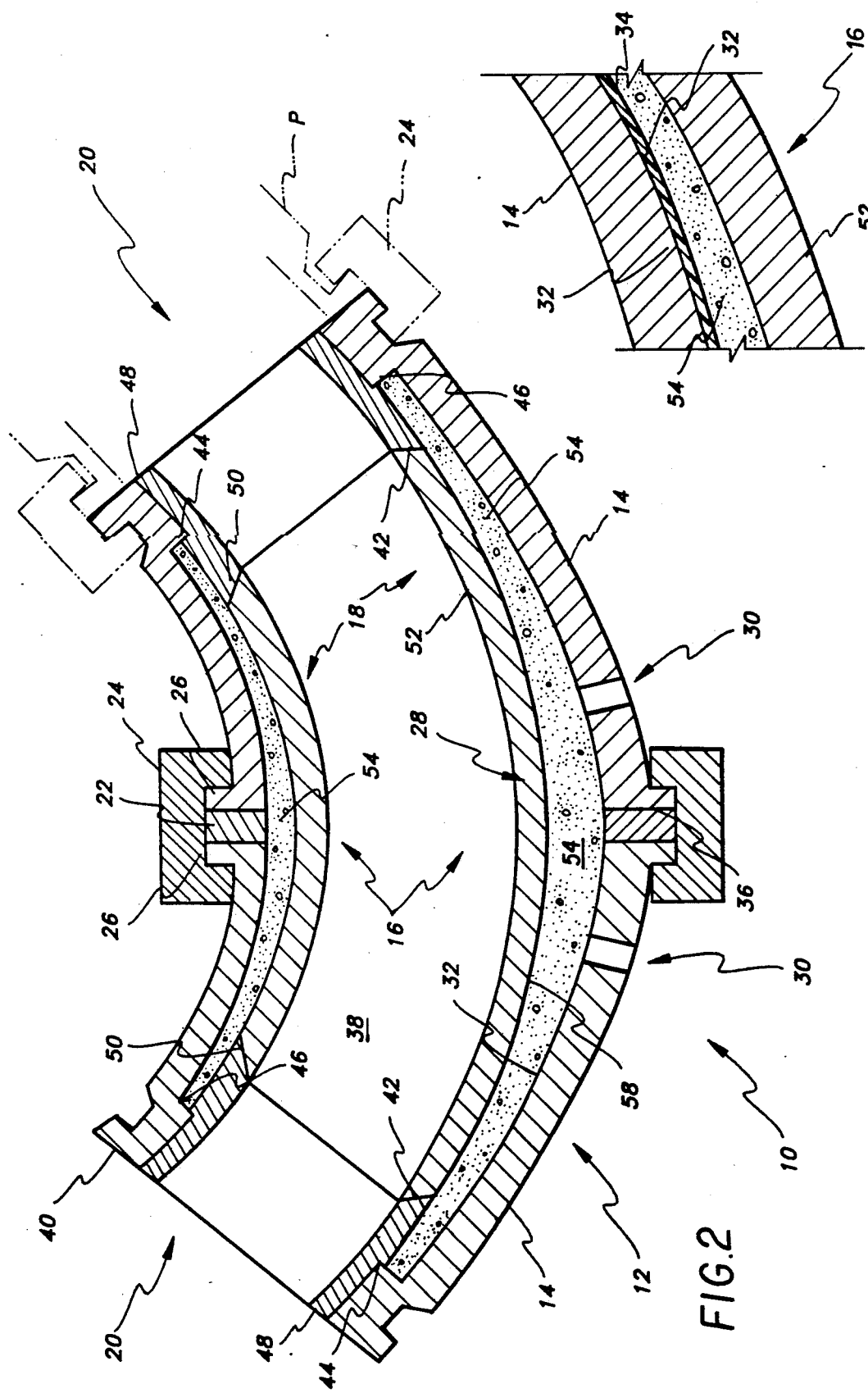

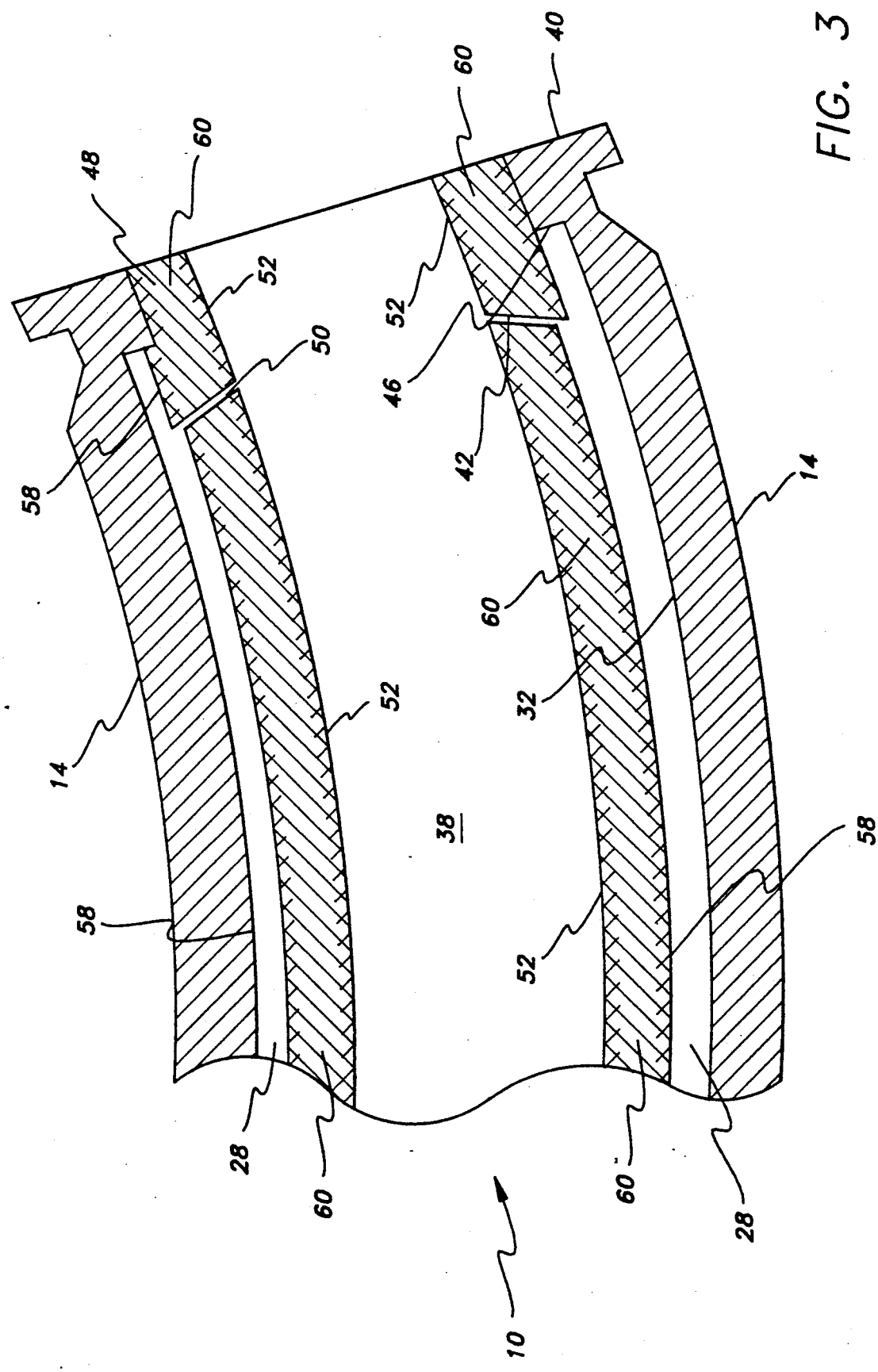

5,188,396

REBUILDABLE SLURRY CONDUIT ELBOW

FIELD OF THE INVENTION

The present invention relates to a conduit elbow having a replaceable wear element.

DESCRIPTION OF THE PRIOR ART

Pumping slurries or aggregates of abrasive material has long been practiced, and apparatus particular to this art has long since been available. One of the most persistent problems is wear of those conduit surfaces lying in the path of flow and being bombarded under velocity by abrasive material. Notably affecting bends or elbows, this leads to localized failure of the conduit, even though the greater part of the conduit system remains unaffected.

The problem of failure of a slurry or abrasive conduit elbow has lead to development of replaceable wear elements. A rebuildable slurry conduit elbow having a split outer housing may be see in U.S. Pat. No.4,461 498, issued to Donald R. Kunsman on Jul. 24, 1984. However, this housing is split longitudinally.

It is well know that hardened metal has superior abrasion resistance, and that a wrought metal housing has desirable strength properties. U.S. Pat. No. 5,044,670, issued to Alexander Esser on Sep.3, 1991, exemplifies the use of hardened metal wear surfaces and a wrought steel outer member.

U.S. Pat. No. 3,768,840, issued to Keith Allan Upton et al. on Oct. 30, 1973, discloses a passage disposed within a pipe coupling for fluid leakage, this leakage being indicative of component failure.

The use of a fully annular bushing to reinforce an elbow connection to a tube is illustrated in U.S. Pat. No. 1,601,093, issued to Charles E. Widmeyer on Sep. 28, 1926.

One major failing of a conduit system having replaceable wear elements is that, for lack of indication of impending failure, the failure typically occurs during operation. This frequently necessitates shutdown at inopportune times, may cause economic loss due to lost material, and further risks creating unsafe conditions and attendant liability.

Even if the failure is sensed, as by periodically tapping on the conduit system, the sensing procedure may aggravate a component weak spot, unnecessarily reducing the useful life of the component.

Frequently, parts and procedures used to replace the conduit member are time consuming and expensive. A need exists for a rebuildable elbow system indicating impending failure, and which is inexpensive and practical to rebuild.

None of the above inventions and patents, taken either singly or in combination, is seen to describe the instant invention as claimed.

SUMMARY OF THE INVENTION

The conduit elbow assembly of the present invention comprises an outer housing, split radially, and one ore more replaceable inner wear elements or liners. The liner comprises a fully annular conduit, loosely fitting the outer housing, thereby defining a void. Looseness of the fit permits material flowing in the conduit to lodge in the void. This material accumulates, and, particularly if cementitious, hardens, filling the void and supporting the wall of the liner.

The liner, made from heat hardened metal, would normally experience wear to the inner heat hardened surface, followed by eventual failure when pressure of fluent material overcomes the strength of the liner. This usually occurs when the center of the liner, typically strong mild steel, erodes following erosion of the inner, hardened surface, leaving only the hardened outer surface of the liner. The outer surface has the same wear resistant qualities as the inner surface, but being brittle as a result of hardening, fails for lack of support, as had been provided to the inner hardened surface by the mild steel center of the liner.

Material buildup in the void provides the erstwhile lacking support. The value of the outer hardened surface as a wear resistant element may thus be realized.

Holes drilled in the outside of the conduit elbow assembly weep grout or other fluent material upon failure of the liner. This weepage is visible, and provides indication of this failure. Structural integrity of the assembly is unaffected, so that immediate shutdown and repair are not necessary.

Spacers separating the outer housing shells are readily removable to expose the liner for cutting. This speeds disassembly and removal of the liner.

The outer housing has internal taper resulting in a greater internal diameter at the split between housing members further facilitating removal of the liner and subsequent cleaning prior to the rebuilding operation.

The liner may be made in three sections. The center section is the thickest, being subject to abrasive attack. The outer sections may be thinners, and are manipulable to accommodate connected piping of varying dimensions. The conduit elbow assembly thus enables piping outer radius change within the conduit system.

The housing is designed to permit standard, mass produced piping components to be used for liner components. This greatly lowers the cost and improves availability of those components which are intended to be replaced.

An adapter ring is provided to mate outer housing shells of different sizes. The adapter ring is particularly intended to make shells used with metric sized piping compatible with shells used with English sized piping.

Accordingly, an object of the present invention is to provide a conduit elbow assembly having a replaceable wear element that is readily disassembled.

A second object is to provide a conduit elbow assembly having a replaceable wear element using readily available replacement components.

A third object is to provide a conduit elbow assembly having a replaceable wear element and providing visual indication of impending wear element failure.

Another object is to provide a conduit elbow assembly which can connect to an inlet pipe and an outlet pipe of differing dimensions.

A further object is to provide a conduit elbow assembly having a replaceable wear element which wear element contributes to the strength of the assembly.

A still further object is to provide a conduit elbow assembly having a replaceable wear element having an outer housing split radially in the bend of the elbow.

Yet another object is to provide a conduit elbow assembly which traps and accumulates some of the material flowing therein, thus reinforcing the replaceable wear element.

Still another object is to provide a conduit elbow assembly having a replaceable wear element wherein two hardened surfaces of the wear element provide service without dismantling the elbow assembly.

With these and other objects in view which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 1 is a partly exploded perspective view of the conduit elbow assembly.

FIG. 2 is a longitudinal cross sectional view of the conduit elbow assembly.

FIG. 3 is a partial longitudinal cross sectional detail view of the conduit elbow assembly, draw to enlarged scale.

FIG. 4 is a fragmentary cross sectional detail view taken from the top center of FIG. 2, showing an alternate embodiment.

FIG. 5 is a fragmentary cross sectional detail view of the conduit elbow assembly, taken from the top right center of FIG. 2, and draw to enlarged scale.

Similar reference characters denote corresponding features consistently throughout the attached drawings.

DETAILED DESCRIPTION OF THE PREFERRED EMBODIMENTS

Figure 7:
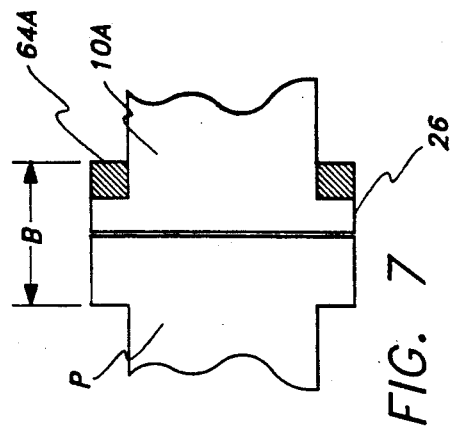
FIG. 7 is a fragmentary cross sectional detail view of the present invention connected to piping manufactured to U. S. dimensional standards.

As seen in FIG. 1, the present invention 10 comprises an outer housing 12 having right and left mirror image sections 14, and, preferably, a three part interior tubular replaceable wear elements 16. Dividing the outer housing 12 radially in the center rather than longitudinally results in a generally tubular member, this configuration having greater strength than the almost planar component show in the patent to Kunsman ('498). The center portion 18 of the wear element 16 may be made from a commercially available plumber's elbow, machined to have beveled ends. The outer portions 20 are sections of straight tubing, having a cooperating bevel. These outer portions 20 will hereinafter be referred to as bushings 20.

It would be possible to employ wear element components in configurations other than tubular, provided that such elements were continuous around the periphery thereof, thus defining a conduit therein. Similarly, the term "diameter"will encompass all possible diameters, pertinent to situations in which the conduit is not tubular.

In a second embodiment, the wear element 16 may be made in a single piece equivalent to uniting the three components 18, 20, 20. This would expedite assembly and repair, but would require manufacture of stock specifically for this purpose. The cost would be much greater, and thus availability would be considerably limited.

The outer housing 12 further includes a spacer 22 comprising identical halves 22A, 22B separating right and left housing sections 14, 14. These four components 14, 14, 22A, 22B are clamped together in tight abutment. Commonly available plumbing clamps 24 which surround flanges 26, 26 on adjacent housing sections 14, 14, as for example, manufactured by the Victaulic Corporation, may be used.

Better seen in FIG. 2, the wear element center portion 18 fits loosely within the outer housing 12, defining a void 28 between the outer housing 12 and the wear element 16. Ports 30 are provided in both housing sections 14, 14 to communicate between this void 28 and the exterior of the elbow assembly 10. The wear element 16 is heat treated to impart hardness to the surfaces of the center portion 18 and bushings 20.

During assembly of the invention 10, the inner surfaces 32 of the housing sections 14 are coated with a resilient material, shown in FIG.5, thus providing a permanent release coating 34. The wear element bushings 20 may be manipulated to abut piping P of varying dimensions and angle of connection. A conduit system comprising piping P to which the present invention 10 is connected and another plumbing clamp 24 are shown in phantom lines in FIG. 2. Of course, piping P is continued on the other side of the elbow assembly 10.

The bushing 20 are first inserted through the large, inside ends 36 of one housing sections 14, and moved through the passageway 38 defined therein to the relatively narrow outside end 40 of the housing section 14. The bushing beveled end 42 is oriented to the center of the outer housing 12. The bushings 20 advance until a shoulder 44 abuts an interfering shoulder 46 formed in the housing section 14. The exterior end 48 of the bushing 20 and the end 40 of the housing section 14 are now flush. This arrangement prevents flow of material in the elbow assembly 10 from dislodging the bushing 20 from its proper location within the outer housing 12.

The wear element center portion 18 is then inserted into one of the housing sections 14 until its beveled end 50 contacts the installed bushing 20. The cooperating believed ends 42,50 maintain the wear element components 18,20 in concentric relation, further facilitate separation of two adjacent wear element components 18,20 during disassembly, and provide a partial seal, thus preventing excessive escape of flowing material into the void 28. The remaining housing section 14 is installed over the protruding wear element center portion 18, and the two piece spacer 22 is placed between the housing sections 14, 14. The clamp 24 is then placed over the flanges 26 formed in the large, inside ends 36 of the housing sections 14, and is locked down. The elbow assembly 10 is ready for attachment to the piping P of the rest of the conduit system.

The conduit system for which this elbow assembly 10 is intended is used to transport aggregate particulate material. This material in most cases will be concrete or mortar, although sand, ash, coal slurry, or other materials may be transported therein. Since it is anticipated that the invention will find its most widespread use in pumping concrete, the fluent material being transported will be referred to either as material or as concrete.

As concrete flows through the elbow assembly 10, the innermost wall surface 52 on the outer side of the bend described by the elbow assembly 10 is immediately subjected to abrasive attack. An area of this wall surface 52, always occurring on the discharge or egress side of the elbow assembly 10, starts to wear. The precise size and location of this area may vary, depending upon the nature and velocity of the fluent material.

When concrete flows through the elbow assembly 10, some very fine particles of that concrete, or grout 54, will lodge and accumulate in the void 28, as seen in FIG. 2. Grout 54 hardens in the void 28 and strongly resists radial stresses to the wear element 16, thus reinforcing the wear element 16.

This reinforcement doubles the useful life of the wear element 16. If there were no such reinforcement, the hardened inner surface 52 of the wear element 16 would provide almost all the utility which could be realized.

Referring now to FIG. 3, the wear element 16 is seen to have inner and outer hardened surfaces 52, 58, and a core 60. Hardening treatment penetrates typically no more than 0.06 inches (1.5 mm) into metal, leaving the core 60 untreated. The inner hardened surface 52 has excellent abrasion resistance, but is highly brittle. The untreated core 60, which has little resistance to abrasion, provides strength to support the inner hardened surface 52, without which the inner hardened surface 52 would soon break under abrasive attack. Thus, when the inner hardened surface 52 is worn through, the core 60 quickly erodes, and the outer hardened surface 58 soon breaks for lack of support.

Again referring to FIG. 2, where grout 54 from concrete or mortar has filled the void 28, necessary support is provided. The outer hardened surface 58 now provides a second wear surface, and the full utility of the wear element 16 can be realized.

The rate of wear of the hardened surfaces 52, 58 is slow, so that the elbow assembly 10 may last in daily use for a period of time measurable in months. During a first use, and long before the inner hardened surface 52 is eroded, the void 28 will be filled with grout 54. Prior to a subsequent use on the second day following the first use, this grout 54 will set up, and the outer hardened surface 58 will become serviceable in the capacity of a second wear surface.

When the wear element 16 is worn through, concrete attacks the grout 54 which has filled the void 28. When this grout 54 has been eroded, fluent concrete has access to the ports 30 communicating with the exterior. Concrete then leaks to the outside of the elbow assembly 10, where it is visible to an observer. The observer may then schedule repairs. Since the outer housing 12 has some resistance to wear, immediate shutdown is not necessary, and operations may continue.

Repair requires dismantling of the elbow assembly 10 and replacement of the wear element 16. The clamp 24 is released, and the spacer 22 is removed, thus exposing the wear element center portion 18. This is shown in FIG. 1, although the space between the housing sections 14, 14 is exaggerated. The actual space would be equal to the width W of the spacer 22. The exposed wear element center portion 18 is cut with a torch (not shown), access thereto being provided upon removal of the spacer 22. The housing sections 14 may be separated from one another. The remnant of the center portion 18 and the bushing 20 are removed from each housing section 14. Hardened grout 54 may be removed mechanically or by chemical action. A new wear element 16 is then installed, and assembly may be completed as described above.

A problem frequently encountered is that piping P employed in concrete pumping is manufactured to either U.S. or metric standards, the piping outer diameter being unequal. Two sizes of outer housings 12 of the present invention 10 would therefore be required for any one nominal pipe size, one size for each industrial standard. It is desirable to adapt piping P from both industrial standards to work within one conduit system. Toward this end, an adapter ring 64 is provided enabling a smaller housing section 14A, seen in FIG. 4, to be clamped to a larger housing section 14B, whereby the elbow assembly 10 provides a transition between piping P of two different dimensional standards.

Figure 9:
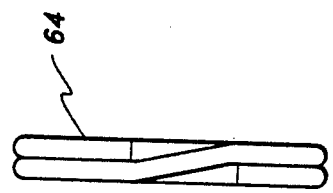
FIG. 9 is a side elevational view of a preferred adapter.

As seen in FIG. 1, the adapter ring 64 is slipped over the housing outer section flange 26. Although the adapter ring 64 is illustrated as a solid annulus, a preferred ring comprises a section of flattened, spiralled wire, seen in side elevation in FIG. 9. A retaining ring as manufactured by the Spirolox Division of Kaydon Ring and Seal, Inc., of St. Louis, Mo., may be used in this capacity. As may be seen in FIG. 4, a gasket 66 forming part of the clamp 24 now seats on a surface even with respect to a corresponding surface 68 of the larger of the two mating flanges 26A, 26B.

Figure 6:
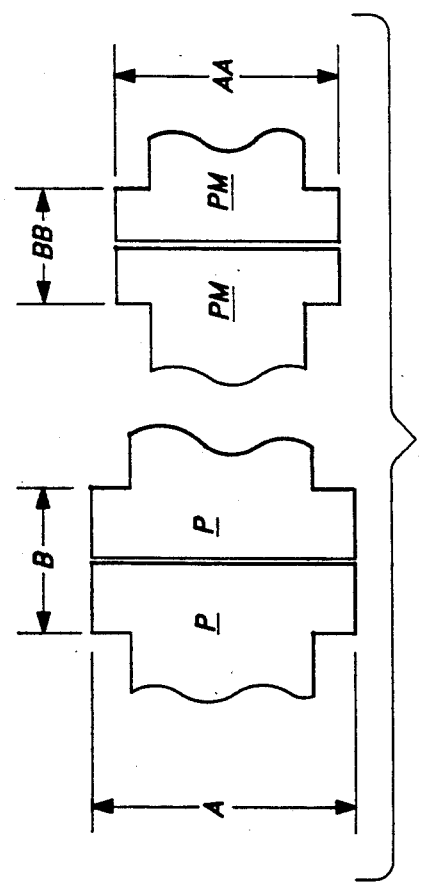
FIG. 6 is a fragmentary cross sectional detail view of piping, taken from the prior art.

It is further possible to provide a housing section 14 capable of mating to piping P of either industrial standard. FIG. 6 illustrates abutment of one pipe P against a second pipe P in the U.S. standard and also illustrates abutment of corresponding metric standard pipes PM, PM. Outer flange diameters A, AA (respectively) of U.S. and metric piping standards are unequal. Similarly, flange thickness B, BB (respectively) are also unequal.

Referring now to FIG. 7, the flange 26 of a preferred embodiment elbow assembly 10A is made to the diameter of the outer flange diameter A of FIG. 6, and of thickness equal to or less than the thickness of a single pipe flange F of the metric standard. The elbow assembly 10 may therefore be mated to piping P adding an adapter 64A selected for this particular combination. This adapter 64A increases flange width to the same dimension B shown in FIG. 6. Therefore, a standard clamp 24 (FIG. 4) may be used to hold piping P from the U.S. industrial standard to the elbow assembly 10A.

Figure 8:
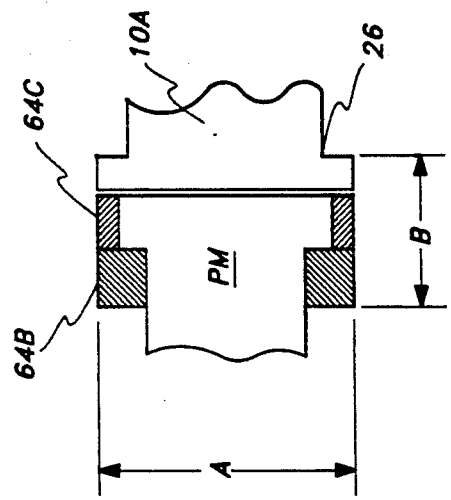
FIG. 8 is a fragmentary cross sectional detail view of the present invention connected to piping manufactured to metric dimensional standards.

The same elbow assembly 10A may also be used with metric piping PM. As shown in FIG. 8, an adapter 64C is used to increase the flange diameter to the same dimension A occurring in the U.S. piping standard. An additional adapter 64B is then installed, thus bringing the combined flange thickness to the same dimension B attained in the union of two pipes P of the U.S. standard. Since the same flange diameter A and the same flange thickness B result from uniting an elbow assembly 10A to piping of either industrial standard, only one size clamp and one size elbow assembly 10A are needed regardless of the piping dimensional standard being used.

It is to be understood that the present invention is not limited to the sole embodiment described above, but encompasses any and all embodiments within the scope of the following claims.

I claim:

1. A rebuildable conduit elbow assembly comprising: an inner replaceable element, hereinafter referred to as a liner, having a wear surface, said liner comprising an integral member forming a monolithic arcuate tube defining conduit means therein, said arcuate tube extending throughout substantially most of a bend being traversed by said conduit elbow assembly, said liner further comprising at least two mating replaceable members, whereby a loose fit and a plurality of said mating replaceable members combine to enable adjustment of at least one of said mating replaceable members, thus allowing said conduit elbow assembly to be adjustably connected to piping, and an outer housing comprising at least two mating sections having juxtaposed faces, each of said mating sections having a flange projecting radially therefrom, and both said flanges being located at said juxtaposed faces such that said flanges are juxtaposed one another and means for maintaining said flanges wherein fluent material is conducted through said liner within said conduit elbow assembly.

2. The conduit elbow assembly as claimed in claim 1, further including at least one orifice extending from an interior of at least one of said housing mating sections to an exterior thereof, whereby material flowing in said conduit elbow assembly is enabled to leak to an exterior of said conduit elbow assembly and be visible, thus providing indication of failure of said liner.

3. The conduit elbow assembly as claimed in claim 1, wherein said means for maintaining said flanges juxtaposed comprises a clamp said outer housing being divided to define said juxtaposed faces along a plane normal to a longitudinal axis of said conduit elbow assembly, said plane being located in a bend defined by said conduit elbow assembly, said outer housing further comprising at least two members located between said juxtaposed faces and in abutment therewith and at least one of said members being removable circumferential member, whereby said liner is partially exposed along a circumferential area upon removal of said clamp and housing removable member, thus enabling partial dismantling of said liner, as by cutting with a torch, while maintaining structural integrity of said conduit elbow assembly.

4. A rebuildable conduit elbow assembly comprising:

an inner replaceable element, hereinafter referred to as a liner, having a wear surface, said liner comprising an integral member forming a monolithic arcuate tube defining conduit means therein, said arcuate tube extending throughout substantially most of a bend being traversed by said conduit elbow assembly, an outer housing comprising at least two mating sections having juxtaposed faces, each of said mating sections having a flange projecting radially therefrom, and both said flanges being located at said juxtaposed faces such that said flanges are juxtaposed one another, wherein fluent material is conducted through said liner within said conduit elbow assembly, a clamp circumferentially surrounding said housing mating section juxtaposed flanges, thereby maintaining said housing mating sections juxtaposed, and at least one circumferential annular spacing means mounted selectively on and to a side of a smaller juxtaposed flange of a smaller one of said housing mating sections, said smaller housing flange and said at least one circumferential annular spacing means thereby being retained juxtaposed by said clamp, whereby housing mating sections of differing flange diameters may be assembled, compatibility thus being provided between said smaller housing mating section and a corresponding relatively larger one of said housing mating sections, whereby said conduit elbow assembly is enabled to include said housing mating sections being of differing dimensions.

5. The conduit elbow assembly as claimed in claim 4, said liner having heat treated inner and outer surfaces, and further being loose fitting within said housing, whereby a void is defined between said liner and said housing, cementitious material flowing in said conduit elbow assembly lodging in, filling and hardening within said void between said liner and said housing, whereby said cementitious material, when hardened, provides support to said liner;

such that possible structural failure of said liner upon progressive erosion thereof by abrasive action of the cementitious material flowing in said conduit elbow assembly is prevented, prior to wear occurring in said outer hardened surface, whereby both said inner and outer hardened surfaces serve as wear surfaces, thus extending the useful life of said liner.

6. The conduit elbow assembly as claimed in claim 4, each one of said housing mating sections having a proximal end and a distal end, means defining a passage extending from said proximal end to said distal end, said means defining a passage having a larger interior diameter at said proximal end and having a smaller interior diameter at said distal end, said proximal end being defined at said juxtaposed face, whereby a void defined between said liner and said housing has a relatively greater cross sectional area at said proximal end of said housing mating section than at said distal end thereof.

7. The conduit elbow assembly as claimed in claim 6, each one of said housing mating sections further including a flange projecting from said means defining a passage into the passage defined thereby, said flange defining a shoulder, and said liner comprising at least two mating replaceable members, at least two of said at least two mating replaceable members having a cooperating shoulder such that abutment and interference fit are assured between each one of said housing mating section shoulders and a corresponding said mating replaceable member cooperating shoulder, whereby egress of a said mating replaceable member from said outer housing through said distal end is prevented.

8. The conduit elbow assembly as claimed in claim 7, said at least two mating replaceable members having cooperating beveling, whereby said at least two mating replaceable members are constrained to remain concentric and also a flow path extending between said conduit means of said two mating replaceable members and said void is partially sealed against penetration therethrough by fine particulate material flowing through said conduit elbow assembly.

* * * * *